United States Patent
Riva et al.

(10) Patent No.: US 10,705,892 B2
(45) Date of Patent: Jul. 7, 2020

(54) AUTOMATICALLY GENERATING CONVERSATIONAL SERVICES FROM A COMPUTING APPLICATION

(71) Applicant: MICROSOFT TECHNOLOGY LICENSING, LLC, Redmond, WA (US)

(72) Inventors: Oriana Riva, Seattle, WA (US); Jason Alan Kace, Seattle, WA (US); Douglas Christopher Burger, Bellevue, WA (US); Jiajun Li, Pittsburgh, PA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 39 days.

(21) Appl. No.: 16/002,915

(22) Filed: Jun. 7, 2018

(65) Prior Publication Data
US 2019/0377619 A1 Dec. 12, 2019

(51) Int. Cl.
G06F 9/54 (2006.01)
G06F 9/451 (2018.01)

(52) U.S. Cl.
CPC .............. *G06F 9/543* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 7,873,537 B2 | 1/2011 | McQueeney et al. | |
| 2012/0131559 A1 | 5/2012 | Wu et al. | |
| 2015/0081764 A1 | 3/2015 | Zhao et al. | |
| 2016/0124742 A1 | 5/2016 | Rangasamy et al. | |
| 2016/0357716 A1 | 12/2016 | Douglas et al. | |

(Continued)

FOREIGN PATENT DOCUMENTS

| | | |
|---|---|---|
| CN | 105577780 A | 5/2016 |
| WO | 2015084554 A1 | 6/2015 |

OTHER PUBLICATIONS

"Actions on Google", Retrieved from «https://developers.google.com/actions/», Retrieved on: Jan. 18, 2018, 2 Pages.

(Continued)

*Primary Examiner* — Syed A Roni
(74) *Attorney, Agent, or Firm* — Newport IP, LLC; Michael C. Johnson

(57) ABSTRACT

The automatic generation of one or more task-oriented conversational bots is disclosed. Illustratively, systems and methods are provided that allow for tracing the interactions of one or more computing applications inclusive of the interaction with one or more programmatic elements of the one or more computing applications, interaction with the graphical user interface(s) of the one or more computing applications, and/or the operation of the one or more computing environments on which the one or more computing applications are executing to collect various state data. The state data can be illustratively graphed to show the overall execution paths of one or more functions/operations of the one or more computing applications for use in generating one or more instructions representative of a desired task-oriented conversational bot that can be operatively executed through one or more application program interfaces of the one or more computing applications.

19 Claims, 9 Drawing Sheets

(56) References Cited

U.S. PATENT DOCUMENTS

| | | | |
|---|---|---|---|
| 2017/0091666 A1 | 3/2017 | Mohammad et al. |
| 2017/0282054 A1 | 10/2017 | Barahona |
| 2017/0289338 A1 | 10/2017 | Riva et al. |
| 2018/0052664 A1 | 2/2018 | Zhang et al. |
| 2018/0129484 A1 | 5/2018 | Kannan et al. |
| 2018/0143857 A1 | 5/2018 | Anbazhagan et al. |
| 2018/0247185 A1 | 8/2018 | Chung et al. |
| 2019/0066694 A1* | 2/2019 | Hirzel |
| 2019/0213284 A1* | 7/2019 | Anand |

OTHER PUBLICATIONS

"Alexa Skills Kit", Retrieved from «https://developer.amazon.com/alexa-skills-kit», Retrieved on: Jan. 18, 2018, 5 Pages.

"Amazon Lex", Retrieved from «https://aws.amazon.com/lex/», Retrieved on: Mar. 7, 2018, 11 Pages.

"Appsee", Retrieved from «https://www.appsee.com/», Retrieved on: Mar. 7, 2018, 7 Pages.

"BotsCrew", Retrieved from «https://web.archive.org/web/20171221061038/https://botscrew.com/», Dec. 21, 2017, 10 Pages.

"Dialogflow: Build Natural and Rich Conversational Experiences", Retrieved from«https://dialogflow.com/», Retrieved on: Mar. 8, 2018, 3 Pages.

"Flurry", Rerieved from «https://y.flurry.com/», Retrieved on: Mar. 8, 2018, 1 Page.

"GoJS—Interactive JavaScript Diagrams in HTML", Retrieved from «https://gojs.net/latest/index.html», Retrieved on: Jan. 18, 2018, 4 Pages.

"Intent Utterance Expander", Retrieved from «https://lab.miguelmota.com/intent-utterance-expander/example/», Retrieved on: Mar. 8, 2018, 1 Pages.

"Localytics", Retrieved from «https://www.localytics.com/», Retrieved on: Jan. 18, 2018, 2 Pages.

"Microsoft—Cognitive Services", Retrieved from «https://www.luis.ai/home», Retrieved on: Jan. 18, 2018, 7 Pages.

"Microsoft: Bot framework", Retrieved from «https://dev.botframework.com/», Retrieved on: Mar. 9, 2018, 1 Page.

"Miguelmota/intent-utterance-generator", Retrieved from «https://github.com/miguelmota/intent-utterance-generator», Jan. 26, 2016, 2 Pages.

"Support Library", Retrieved from «https://developer.android.com/topic/libraries/support-library/index.html», Retrieved on: Mar. 7, 2018, 4 Pages.

"Watson", Retrieved from «https://web.archive.org/web/20170726060806/https://www.ibm.com/watson/developer/», Jul. 26, 2017, 9 Pages.

"What Users Say—Making Sure Alexa Understands What People are Saying", Retrieved from«https://developer.amazon.com/designing-for-voice/what-users-say», Retrieved on: Mar. 7, 2018, 8 Pages.

Abadi, et al., "TensorFlow: A System for Large-scale Machine Learning", In Proceedings of of the 12th USENIX conference on Operating Systems Design and Implementation, vol. 16, Nov. 2, 2016, pp. 265-283.

Alharbi, et al., "Collect, Decompile, Extract, Stats, and Diff: Mining Design Pattern Changes in Android Apps", In Proceedings of of the 17th International Conference on Human-Computer Interaction with Mobile Devices and Services, Aug. 24, 2015, 10 Pages.

Ali, et al., "Automation of Question Generation From Sentences", In Proceedings of the Third Workshop on Question Generation, Jun. 18, 2010, pp. 58-67.

Aydin, et al., "Crowdsourcing for Multiple-Choice Question Answering", In Proceedings of the Twenty-Sixth Annual Conference on Innovative Applications of Artificial Intelligence, Jul. 27, 2014, pp. 2946-2953.

Bobrow, et al., "GUS, A Frame-Driven Dialog System", In Journal of Artificial intelligence, vol. 8, Issue 2, Apr. 31, 1977, pp. 155-173.

Bordes, et al., "Learning End-to-End Goal- Oriented Dialog", In Journal of the Computing Research Repository, May 2016, pp. 1-15.

Chung, et al., "Empirical Evaluation of Gated Recurrent Neural Networks on Sequence Modeling", In Journal of the Computing Research Repository, Dec. 11, 2014, pp. 1-9.

Colby, et al., "Artificial Paranoia", In Journal of Artificial Intelligence, vol. 2, Issue 1, Mar. 1971, pp. 1-25.

Cypher, et al., "Watch What I do: Programming by Demonstration", In Publication of MIT press, May 4, 1993.

Deka, et al., "ERICA: Interaction Mining Mobile Apps", In Proceedings of the 29th Annual Symposium on User Interface Software and Technology, Oct. 16, 2016, pp. 767-776.

Zhou et al."Neural Question Generation from Text: A Preliminary Study", In Journal of the Computing Research Repository, Apr. 2017, 6 Pages.

Deka, et al., "Rico: A Mobile App Dataset for Building Data-Driven Design Applications", In Proceedings of the 30th Annual ACM Symposium on User Interface Software and Technology, Oct. 22, 2017, pp. 845-854.

Deka, et al., "ZIPT: Zero-Integration Performance Testing of Mobile App Designs", In Proceedings of the 30th Annual ACM Symposium on User Interface Software and Technology, Oct. 22, 2017, pp. 727-736.

Dodge, et al., "Evaluating Prerequisite Qualities for Learning End-to-End Dialog Systems", In Proceedings of International Conference on Learning Representations, May 2016, pp. 1-16.

Doubrovkine, Daniel, "alexa-js/alexa-utterances", Retrieved from«https://github.com/alexa-js/alexa-utterances», Retrieved on:Jan. 18, 2018, 3 Pages.

Du, et al., "Learning to Ask: Neural Question Generation for Reading Comprehension", In Proceedings of the 55th Annual Meeting of the Association for Computational Linguistics, Apr. 29, 2017, 11 Pages.

Dunn, Jeff, "Amazon's Alexa has gained 14,000 skills in the last year", Retrieved from «https://www.businessinsider.in/Amazons-Alexa-has-gained-14000-skills-in-the-last-year/articleshow/59464796.cms», Jul. 6, 2017,10 Pages.

Fernandes, et al., "Appstract: Onthe-fly App Content Semantics with Better Privacy", In Proceedings of the 22nd Annual International Conference on Mobile Computing and Networking, Oct. 3, 2016, pp 361-374.

Finkel, et al., "Incorporating Non-local Information into Information Extraction Systems by Gibbs Sampling", In Proceedings of the 43rd Annual Meeting on Association for Computational Linguistics, Jun. 25, 2005, pp. 363-370.

Fleiss, Joseph L., "Measuring Nominal Scale Agreement Among Many Raters", In Journal of Psychological Bulletin, vol. 76, Issue 5, Nov. 1971, pp. 378-382.

Ghazvininejad, et al., "A Knowledge—Grounded Neural Conversation Model", In Journal of the Computing Research Repository, Feb. 7, 2017, 10 Pages.

Han, et al., "NLify: Lightweight Spoken Natural Language Interfaces via Exhaustive Paraphrasing", In Proceedings of the ACM International Joint Conference on Pervasive and Ubiquitous Computing, Sep. 8, 2013,10 Pages.

Hao, et al., "PUMA: Programmable UI-Automation for Large-Scale Dynamic Analysis of Mobile Apps", In Proceedings of the 12th Annual International Conference on Mobile Systems, Applications, and Services, Jun. 16, 2014, 14 Pages.

Heyday.AI, Etienne Mérineau, "One Year Later, Here's the State of the Chatbot Economy", Retrieved from «https://venturebeat.com/2017/06/11/one-year-later-heres-the-state-of-the-chatbot-economy/», Jun. 11, 2017, 86 Pages.

Hochreiter, et al., "Long Short-Term Memory", In Journal of Neural Computation, vol. 9, Issue 8, Nov. 1997, pp. 1-32.

Jen, Chef, "Coffee Shop Chains That Make Mornings Bearable", Retrieved from«https://web.archive.org/web/20170824162940/http://www.ranker.com:80/list/best-coffee-shop-chains/chef-jen», Aug. 24, 2017, 7 Pages.

Jurafsky, et al., "Dialog Systems and Chatbots", In Publication of Pearson, 2000, pp. 1-25.

Kalady, et al., "Natural Language Question Generation Using Syntax and Keywords", In Proceedings of the Third Workshop on Question Generation, Jun. 18, 2010, 95 Pages.

(56) References Cited

OTHER PUBLICATIONS

Kalchbrenner, et al., "Recurrent Continuous Translation Models", In Proceedings of the Conference on Empirical Methods in Natural Language Processing, Oct. 18, 2013, pp. 1700-1709.

Kasturi, et al., "The Cohort and Speechify Libraries for Rapid Construction of Speech Enabled Applications for Android", In Proceedings of the of the 16th Annual Meeting of the Special Interest Group on Discourse and Dialogue, Sep. 2, 2015, pp. 441-443.

Koehn, et al., "Moses: Open Source Toolkit for Statistical Machine Translation", In Proceedings of the 45th Annual Meeting of the ACL on Interactive Poster and Demonstration Sessions, Jun. 2007, pp. 177-180.

Labutov, et al., "Deep Questions without Deep Understanding", In Proceedings of the 53rd Annual Meeting of the Association for Computational Linguistics, Jul. 26, 2015, pp. 889-898.

Landis, et al., "The Measurement of Observer Agreement for Categorical Data", In Journal of Biometrics, vol. 33, Issue 1, Mar. 1977, pp. 159-174.

Laput, et al., "PixelTone: A Multimodal Interface for Image Editing", In Proceedings of the SIGCHI Conference on Human Factors in Computing Systems, Apr. 27, 2013, pp. 2185-2194.

Lau, et al., "A Conversational Interface to Web Automation", In Proceedings of the 23rd Annual ACM Symposium on User Interface Software and Technology, Oct. 3, 2010, 10 Pages.

Lemon, et al., "An ISU Dialogue System Exhibiting Reinforcement Learning of Dialogue Policies: Generic Slot-filling in the TALK In-car System", In Proceedings of the 11th Conference of the European Chapter of the Association for Computational Linguistics: Posters & Demonstrations, Apr. 5, 2006, pp. 119-122.

Li, et al. "A Persona-based Neural Conversation Model", In Proceedings of the 54th Annual Meeting of the Association for Computational Linguistics, Mar. 19, 2016, 10 Pages.

Li, et al., "Adversarial Learning for Neural Dialogue Generation", In Proceedings of the Conference on Empirical Methods in Natural Language Processing, Sep. 9, 2017, 13 Pages.

Li, et al., "Deep Reinforcement Learning for Dialogue Generation", In Proceedings of the Conference on Empirical Methods in Natural Language Processing, Nov. 1, 2016, 11 Pages.

Li, et al., "DroidBot: a lightweight UI-guided test input generator for Android", In Proceedings of the 39th International Conference on Software Engineering Companion, May 20, 2017, pp. 23-26.

Li, et al., "SUGILITE: Creating Multimodal Smartphone Automation by Demonstration", In Proceedings of the CHI Conference on Human Factors in Computing Systems, May 6, 2017, pp. 6038-6049.

Matney, Luca, S., "Kik Users have Exchanged Over 1.8 Billion Messages with the Platform's 20,000 Chatbots", Retrieved from «https://techcrunch.com/2016/08/03/kik-users-have-exchanged-over-1-8-billion-messages-with-the-platforms-20000-chatbots/», Aug. 3, 2016, 6 Pages.

Mitkov et al., "Computer-aided Generation of Multiple-choice Tests", In Proceedings of the HLT-NAACL Workshop on Building Educational Applications Using Natural Language Processing, vol. 2, May 31, 2003, 6 Pages.

"wit.ai", Retrieved from «https://wit.ai/» Retrieved on: Mar. 26, 2018, 1 Page.

Nunez, Michael, "The Amazon Echo Now Has 10,000 Mostly Useless 'Skills'", Retrieved from «https://gizmodo.com/the-amazon-echo-now-has-10-000-mostly-useless-skills-1792695362», Feb. 23, 2017, 3 Pages.

Orf, Darren, "Facebook Chatbots Are Frustrating and Useless", Retrieved from« https://gizmodo.com/facebook-messenger-chatbots-are-more-frustrating-than-h-1770732045», Apr. 14, 2016, 4 Pages.

Papineni, et al., "BLEU: A Method for Automatic Evaluation of Machine Translation", In Proceedings of the 40th Annual Meeting of the Association for Computational Linguistics, Jul. 2002, 8 Pages.

Rafael, Banchs E., "Movie-DiC: A Movie Dialogue Corpus for Research and Development", In Proceedings of the 50th Annual Meeting of the Association for Computational Linguistics: Short Papers, vol. 2, Jul. 8, 2012, pp. 203-207.

Ritter, et al., "Data-Driven Response Generation in Social Media", In Proceedings of the Conference on Empirical Methods in Natural Language Processing, Jul. 27, 2011, pp. 583-593.

Rus, et al., "The First Question Generation Shared Task Evaluation Challenge", In Proceedings of the 6th International Natural Language Generation Conference, Jul. 7, 2010, 7 Pages.

Schwartz, Barry, "Google: Chatbots Don't Make Your Pages Better", Retrieved from«https://www.seroundtable.com/google-on-chatbots-seo-24494.html», Sep. 20, 2017, 3 Pages.

Serban, et al., "Building End-to-end Dialogue Systems Using Generative Hierarchical Neural Network Models", In Proceedings of the Thirtieth AAAI Conference on Artificial Intelligence, vol. 16, Feb. 12, 2016, pp. 3776-3783.

Serban, et al., "Generating Factoid Questions With Recurrent Neural Networks: The 30M Factoid Question-Answer Corpus", In Proceedings of the 54th Annual Meeting of the Association for Computational Linguistics, Aug. 7, 2016, 13 Pages.

Shang, et al., "Neural Responding Machine for Short-Text Conversation", In Proceedings of the 53rd Annual Meeting of the Association for Computational Linguistics and the 7th International Joint Conference on Natural Language Processing of the Asian Federation of Natural Language Processing, Jul. 26, 2015, 12 Pages.

Shirazi, et al., "Insights into Layout Patterns of Mobile User Interfaces by an Automatic Analysis of Android Apps", In Proceedings of the 5th ACM SIGCHI Symposium on Engineering Interactive Computing Systems, Jun. 24, 2013, 10 Pages.

Sordoni, et al., "A Neural Network Approach to Context-Sensitive Generation of Conversational Responses", In Proceedings of the North American Chapter of the Association for Computational Linguistics: Human Language Technologies, Jun. 22, 2015, 11 Pages.

Sutskever, et al., "Sequence to Sequence Learning with Neural Networks", In Proceedings of Advances in Neural Information Processing Systems, Dec. 8, 2014, pp. 1-9.

Vaswani, et al., "Attention Is All You Need", In Proceedings of 31st Conference on Neural Information Processing Systems, Jun. 2017, 11 Pages.

Vinyals, et al., "A Neural Conversational Model", In Proceedings of the 31st International Conference on Machine Learning, Jun. 19, 2015, 8 Pages.

Wang, et al., "A Dataset for Research on Short-Text Conversations", In Proceedings of the Conference on Empirical Methods in Natural Language Processing, Oct. 18, 2013, pp. 935-945.

Wang, et al., "A Simple and Generic Belief Tracking Mechanism for the Dialog State Tracking Challenge: On the Believability of Observed information", In Proceedings of the SIGDIAL Conference, Aug. 22, 2013, pp. 423-432.

Ward, et al., "Recent Improvements in the CMU Spoken Language Understanding System", In Proceedings of the Workshop on Human Language Technology, Mar. 8, 1994, pp. 213-216.

Weizenbaum, Joseph, "ELIZA-A Computer Program for the Study of Natural Language Communication Between Man and Machine", In Journal of Communications of the ACM Volume 9, Issue 1, Jan. 1, 1966, pp. 1-7.

Welbl, et al., "Crowdsourcing Multiple Choice Science Questions", In Journal of the Computing Research Repository, Jul. 19, 2017, 13 Pages.

Wen, et al., "Stochastic Language Generation in Dialogue using Recurrent Neural Networks with Convolutional Sentence Reranking", In Proceedings of the 16th Annual Meeting of the Special Interest Group on Discourse and Dialogue, Sep. 2, 2015, 10 Pages.

Williams, et al., "Hybrid Code Networks: Practical and Efficient end-to-end Dialog Control with Supervised and Reinforcement Learning", In Proceedings of the 55th Annual Meeting of the Association for Computational Linguistics, Jul. 30, 2017, 13 Pages.

Yuan, et al., "Machine Comprehension by Text-to-Text Neural Question Generation", In Journal of the Computing Research Repository, May 4, 2017, pp 1-14.

(56) References Cited

OTHER PUBLICATIONS

Nath, et al., "Systems and Mechanisms to Turn Mobile Applications Into Services", Filed Date: May 4, 2017, 29 Pages.

"International Search Report and Written Opinion Issued in PCT Application No. PCT/US18/028223", dated Jul. 24, 2018, 13 Pages.

"Non Final Office Action Issued in U.S. Appl. No. 15/587,311", dated Aug. 8, 2019, 11 Pages.

Arzt, et al. "Android-Specific Components of FlowDroid", Retrieved from: https://github.com/AndroidTamer/soot-infoflow-android, Retrieved on: Mar. 9, 2017, 2 Pages.

Arzt, et al., "Data Flow Tracking Components for Java", Retrieved from: https://github.com/secure-software-engineering/soot-infoflow, Retrieved on: Mar. 9, 2017, 2 pages.

Arzt, et al., "FlowDroid: Precise Context, Flow, Field, Object-Sensitive and Lifecycle-Aware Taint Analysis for Android Apps", In Proceedings of 35th ACM SIGPLAN Conference on Programming Language Design and Implementation, Jun. 9, 2014, 11 Pages.

Arzt, et al., "StubDroid: Automatic Inference of Precise Data-Flow Summaries for the Android Framework", In Proceedings of the IEEE/ACM 38th International Conference on Software Engineering, May 14, 2016, pp. 725-735.

Pimenta, Carlos, "Moving Beyond Mobile Apps", Retrieved from: https://web.archive.org/web/20170329022120/http://blog.macquarium.com/moving-beyond-mobile-apps, Jul. 20, 2016, 13 Pages.

Deonier, et al., "Open Source Introducing DeepLinkDispatch: Easy Declaration and Routing of Your Deep Links", Retrieved from: https://web.archive.org/web/20150709001849/http://nerds.airbnb.com/deeplinkdispatch/, Jun. 30, 2015, 5 Pages.

Klieber, et al., "Android Taint Flow Analysis for App Sets", In Proceedings of the 3rd ACM SIGPLAN International Workshop on the State of the Art in Java Program Analysis, Jun. 12, 2014, 6 Pages.

Li, et al., "Kite: Building Conversational Bots from Mobile Apps", In Proceedings of the 16th Annual International Conference on Mobile Systems, Applications, and Services, Jun. 10, 2018, pp. 96-109.

Ma, et al., "DroidLink: Automated Generation of Deep Links for Android Apps", In Journal of Computing Research Repository, May 23, 2016, 21 Pages.

"OneLink", Retrieved from https://www.appsflyer.com/product/one-link-deep-linking/?utm_source=google&utm_medium=cpc&utm_term=deep%20linking&utm_content=ad1&utm_campaign=olink_dlink_Asia, Retrieved on: Mar. 3, 2017, 5 Pages.

"International Search Report and Written Opinion Issued in PCT Application No. PCT/US2019/033193", dated Aug. 21, 2019, 12 Pages.

* cited by examiner

AUTOMATICALLY GENERATING CONVERSATIONAL SERVICES FROM A COMPUTING APPLICATION

BACKGROUND

The promise and excitement around conversational services has rapidly grown in recent years. Besides the popularity of intelligent assistants, there is a rise in the use and execution of specialized bots (e.g., also called "skills" in the ALEXA virtual assistant from AMAZON.COM, INC. and the CORTANA virtual assistant from MICROSOFT CORP., and "actions" in the GOOGLE ASSISTANT virtual assistant from GOOGLE LLC.). Particularly useful are task-oriented chatbots that act as agents on behalf of users to interact with external services to accomplish specific tasks through the execution of one or more operations of a corresponding computer application—such as booking a taxi cab, making a restaurant reservation, or finding a recipe—using natural language conversation.

Currently, most conversational services can be built using a slot-filling approach. With such an approach, the user's phrase (e.g., "I want a coffee") indicates an intent, an action the system supports, such as "order-coffee (with additional parameters such as type, size). Input parameters necessary for intent execution, such as coffee type and size, can be described as slots. With the slot filling approach, a control structure can operatively define the operations for a multi-turn conversation between the system and the user to collect all slots necessary to fill the intent.

Slot-filling has proven reliable but requires significant developer effort. First, control structures, typically in the form of finite-state automata, need to be hand-designed for each task. Such control structures can be complex as they need to account for many possible execution paths. Second, to support user interactions in natural language, models for understanding user questions and answers need to be trained. Training typically requires many utterances, i.e., sample phrases users may use during the interaction. For example, even to a simple question like "What is your party size?"—users may answer in many different ways such as "3", "all of us", "me and my wife" or "not sure, I'll tell you later". To train robust models, a developer must consider all such possible phrase variations and provide dozens of utterances for each slot and for each intent. Finally, developers need to enumerate possible values for each slot to boost slot recognition in language understanding. As a result, this whole process requires significant manual coding, thus hindering scalability to new tasks and domains.

An alternative to slot-filling is a corpus-based approach where bots are automatically trained from datasets of past conversations. This approach has shown promise for non-task-oriented "chit-chat" bots, but it is unclear whether it alone can model task-oriented bots. Exclusive machine-learned systems cannot guarantee critical in-task constraints are met (e.g., a user cannot reserve a restaurant without specifying a time), and they lack a model to ensure completion of an actual objective in the task. These systems are also difficult to train due to the scarcity of domain-specific conversation logs.

Hybrid approaches also exist. For example, hybrid code networks (HCNs) is an approach to make machine-learned systems practical by combining a recurrent neural network with developer hand-coded rules. HCNs reduce the amount of training data at the expense of developer effort. Another hybrid approach is the "knowledge-grounded" conversation model which injects knowledge from textual data (e.g., restaurant reviews on FOURSQUARE®) into models derived from conversational data (e.g. TWITTER®) to generate informative answers. However, these models work only for single-turn responses and depend on in-domain knowledge sources.

It is with respect to these considerations and others that the disclosure made herein is presented.

SUMMARY

Technologies described herein allow for the automatic creation of task-oriented conversational bots for execution in cooperation with one or more computing applications. Operatively, the herein described systems and methods provide for the tracing of interactions with a computing application inclusive of the interactions with the graphical user interface (GUI) of the computing application in context of the execution of one or more computing application tasks/operations to achieve the results of a particular task to retrieve state data about the computing application, the computing environment on which the computing application executes, as well as GUI states for use in automatically generating a task-oriented bot operative to execute one or more desired tasks. With such approach, an immediate technical benefit can be realized in the form of increasing the overall processing efficiency associated with the generation and execution of one or more task-oriented conversational bots.

In order to realize the technical benefits mentioned briefly above, illustratively the herein described systems and methods provide for the automatic generation of conversational services that results in the enhanced processing efficiency and scalability of the computing process generating conversational services. In an illustrative operation, data can be collected that can be representative of one or more interactions with one or more computing applications executable on one or more computing environments and/or traces of one or more operations/features/commands of the one or more computing environments and/or the one or more computing environments' GUI, if available. The collected data can include but is not limited to data representative of the state of the one or more computing applications, the state of the one or more computing environments, and the state of the one or more GUIs, if available.

In an illustrative implementation, the collected data can be used to define one or more service application program interfaces (APIs) that can be operative to cooperate with one or more computing applications, one or more computing environments, and/or one or more GUIs of the one or more computing applications, if available. The collected data can also be used to generate one or more task models usable by an exemplary bot or personal assistant system for the creation and execution of one or more conversational service.

Additionally, the collected data can be used as input data to an exemplary question-answer interface generation system including neural network models having been trained using open-domain conversational logs. In an illustrative implementation, the one or more generated conversational service can be executable by one or more mobile applications such that a created service API call can be executed according to a per-user interaction. Illustratively, the collected data specific to the interactions with one or more GUIs of one or more computing applications can be operatively used to create a task-oriented "skill" and/or "action" for one or more personal digital assistants such as the CORTANA virtual assistant from MICROSOFT CORP.

In an illustrative implementation, a task-oriented conversational bot authoring tool can be provided that can include a graphical user interface to allow for the interaction by a participating user (e.g., developer/author) with data collected for display in the illustrative authoring tool GUI as part of the automatic creation of the task-oriented conversational bots. In the illustrative implementation, the data collected can include state graphs having one or more execution paths showing the execution of various operations/features/commands of one or computing applications, the one or more GUIs, and/or the one or more computing environments. Illustratively, the task-oriented conversational bot can be generated along a selected operation(s) of the one or more execution paths on a synchronous and/or asynchronous basis to achieve a desired series of functions/operations to be performed by the one or more computing applications.

It should be appreciated that, although described in relation to a system, the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
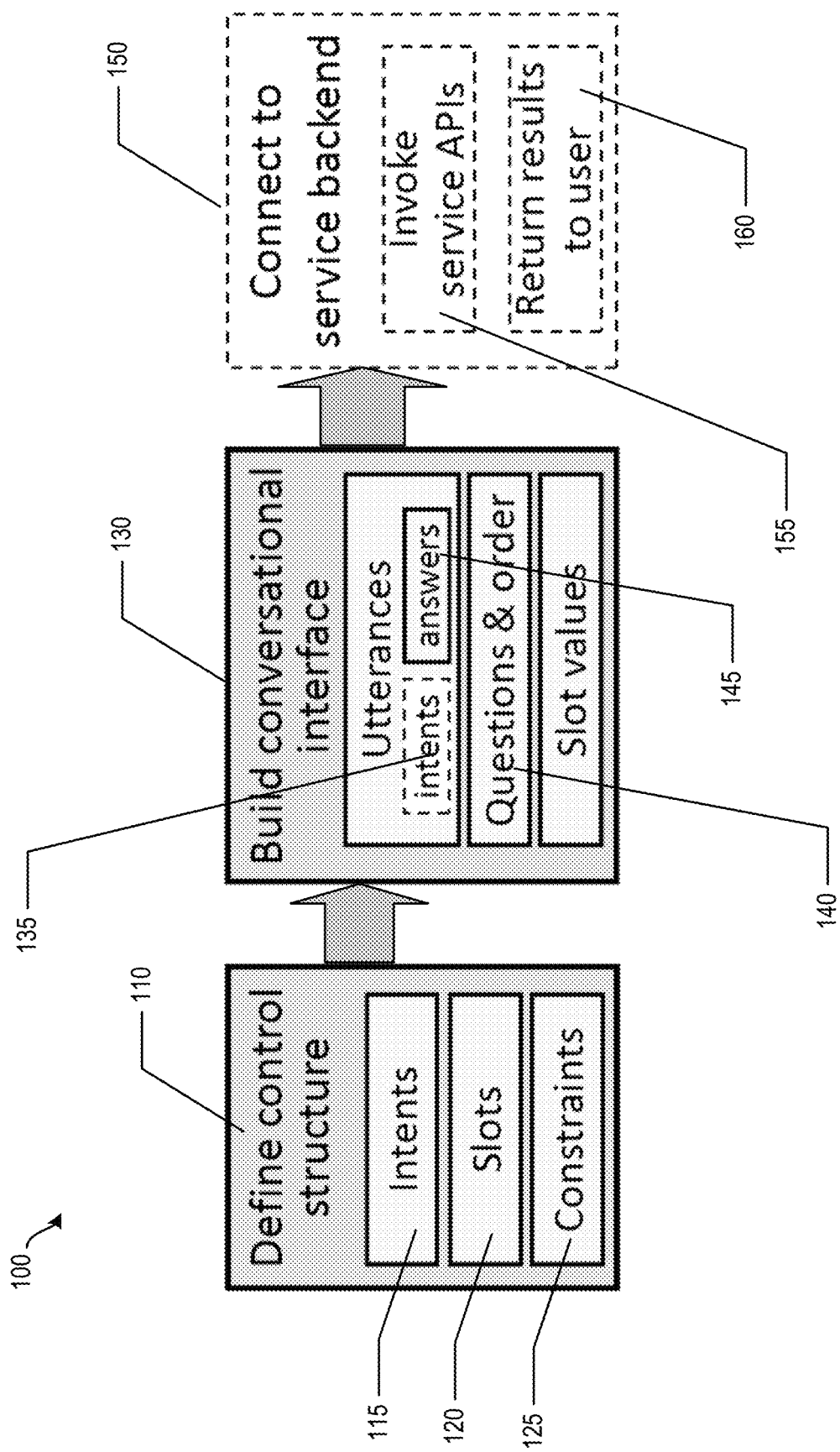
FIG. 1 illustrates an exemplary slot-based conversational bot building process.

The following Detailed Description describes technologies that allow for the automatic creation of task-oriented conversational bots for execution on one or more computing applications. In an illustrative implementation, the one or more computing applications can support a graphical user interface having one or more programmatic elements that operatively can provide for the execution of one or more operations on the one or more computing applications. These exemplary one or more programmatic elements can include but are not limited to buttons, menus, dialog boxes etc. that when interacted with initiate the execution of one or instructions in the one or more computing applications.

Operatively, the herein described systems and methods provide for the tracing of interactions with a computing application inclusive of the interactions with the GUI of the computer application in context of the execution of one or more computing application tasks/operations to achieve the results of a particular task to retrieve various state data about the computing application, the computing environment on which the computing application executes, as well as GUI states for use in automatically generating a service or bot operative to execute one or more desired tasks. By automatically bootstrapping conversational services from one or more cooperating computing applications, there results a reduced number of processing steps to generate the instructions required to perform one or more operations on the one or more computing applications, thereby increasing processing efficiency for the computing environment on which the one or more computing applications can execute.

In order to realize the technical benefits mentioned briefly above, illustratively the herein described systems and methods provide for the automatic generation of conversational services. In an illustrative operation, data can be collected that can be representative of one or more interactions with a one or more computing applications executable on one or more computing environments and/or traces of one or more operations/features/commands of the one or more computing environments and/or the one or more computing environments' GUI(s) if available. The collected data can include but is not limited to data representative of the state of the one or more computing applications, the state of the one or more computing environments, and the state of the one or more GUIs, if available.

In an illustrative implementation, the collected data can be used to define one or more service APIs that can be operative to cooperate with one or more computing applications, one or more computing environments, and/or one or more GUIs of the one or more computing applications, if available. The collected data can also be used to generate one or more task models usable by an exemplary bot or personal assistant system for the creation and execution of one or more tasks. Additionally, the collected data can be used as input data by an exemplary question-answer interface generation system that can be operable to use one or more neural network models having been trained according to open-domain conversational logs. In an illustrative implementation, the one or more generated conversational services can be executable by one or more mobile applications such that a created service API call can be executed according to a per-user interaction. Illustratively, the collected data specific to the interactions with one or more GUIs of one or more computing applications can be operatively used to create a task-oriented "skill" and/or "action" for one or more personal digital assistants such as the CORTANA virtual assistant from MICROSOFT CORP.

In an illustrative implementation, a task-oriented conversational bot authoring tool can be provided that can include a graphical user interface to allow for the interaction by a participating user (e.g., developer/author) with data collected for display in the illustrative authoring tool GUI as part of the automatic creation of the task-oriented conversational bots. In the illustrative implementation, the data collected can include state graphs having one or more execution paths showing the execution of various operations/features/commands of one or computing applications, the one or more GUIs, and/or the one or more computing environments. Illustratively, the task-oriented conversational bot can be generated along a selected operation(s) of the one or more execution paths on a synchronous and/or asynchronous basis to achieve a desired series of functions/operations to be performed by the one or more computing applications.

In an illustrative implementation, the herein described systems and methods can use an exemplary user interface (UI) tree model to represent exemplary computer application interaction data in the screens of the UI, including but not limited to UI elements as well as the relationships between UI elements and one or more interactions that can be performed on them. In the illustrative implementation, task models from interactions with an exemplary computing application can be inferred through one or more traces by operatively abstracting UI screens and events into intents and slots. In an illustrative operation, the trace data can be further partitioned to identify one or more operational states of the computing application executing an exemplary user interface. Such states can include dynamic and static computing application states. The computing application state data can be used when generating the bot instructive of how the computing application behaves during the execution of an application operation and/or function.

Illustratively, a task model can represent the logical backbone of a bot. In an illustrative implementation, a question-answer interface for conversations can be automatically generated that, operatively, utilizes a hybrid rule-based and neural network approach. In an illustrative operation, using an exemplary computing application's GUI and on-screen contents, properties and semantics of slots can be inferred, so to be able to generate prompt questions by means of few semantic rules. To generate questions for slots that cannot be semantically classified, and to generate utterances for user answers, one or more neural network transduction models can be trained (e.g., through the utilization of several million conversation pairs provide by one or more large social media networks such as the TWITTER communications service from TWITTER INC.).

In an illustrative implementation, task-oriented bots can understand a user request and execute the related task. As is shown in FIG. 1, an exemplary task-oriented bot creation process 100 can include but is not limited to three operations: 110; 130; and 150. As is shown, operation 110 can include defining a control structure. Operatively, a software developer can define a control structure representing the kinds of actions, termed "intents" 115, that an exemplary computing environment can support. Illustratively, an intent 115 can be associated with one or more slots 120 and may have one or more constraints or dependencies 125 on other intents. A constraint can be considered one or more conditions specific to the execution of an intent.

For example, in a restaurant-booking bot, an intent named Reserve Restaurant can be defined and can have slots that can include: 1) restaurant name; 2) party size; and 3) time. A corresponding intent named Confirm Reservation can have a dependency on the intent Reserve Restaurant. In an illustrative operation, based on such exemplary structure, the bot can perform slot filling, i.e., collecting slots (e.g., required data elements) for each intent and then performing the associated action(s).

At operation 130, a developer can define (e.g., by training machine learning models capable of language processing) a conversational interface for the control structure (i.e., a set of intents 135 that an exemplary computing environment can support) that can operatively perform one or more functions including but not limited to: 1) recognizing user intents 115 and slots 120; 2) querying users 140 for the required slots 120; and 3) understanding user answers 145. For example, from a phrase "I want a table for two", an exemplary computing environment executing creation process 100 can recognize the intent named Reserve Restaurant and the slot party-size equals two, and then query the user for the missing slot time. The resultant intent can then be communicated at operation 150 to a cooperating service backend operation of an exemplary computing environment capable of invoking one or more service APIs and return the results 160 from such API calls to a participating user (not shown) (e.g., confirming a reservation).

Figure 2:
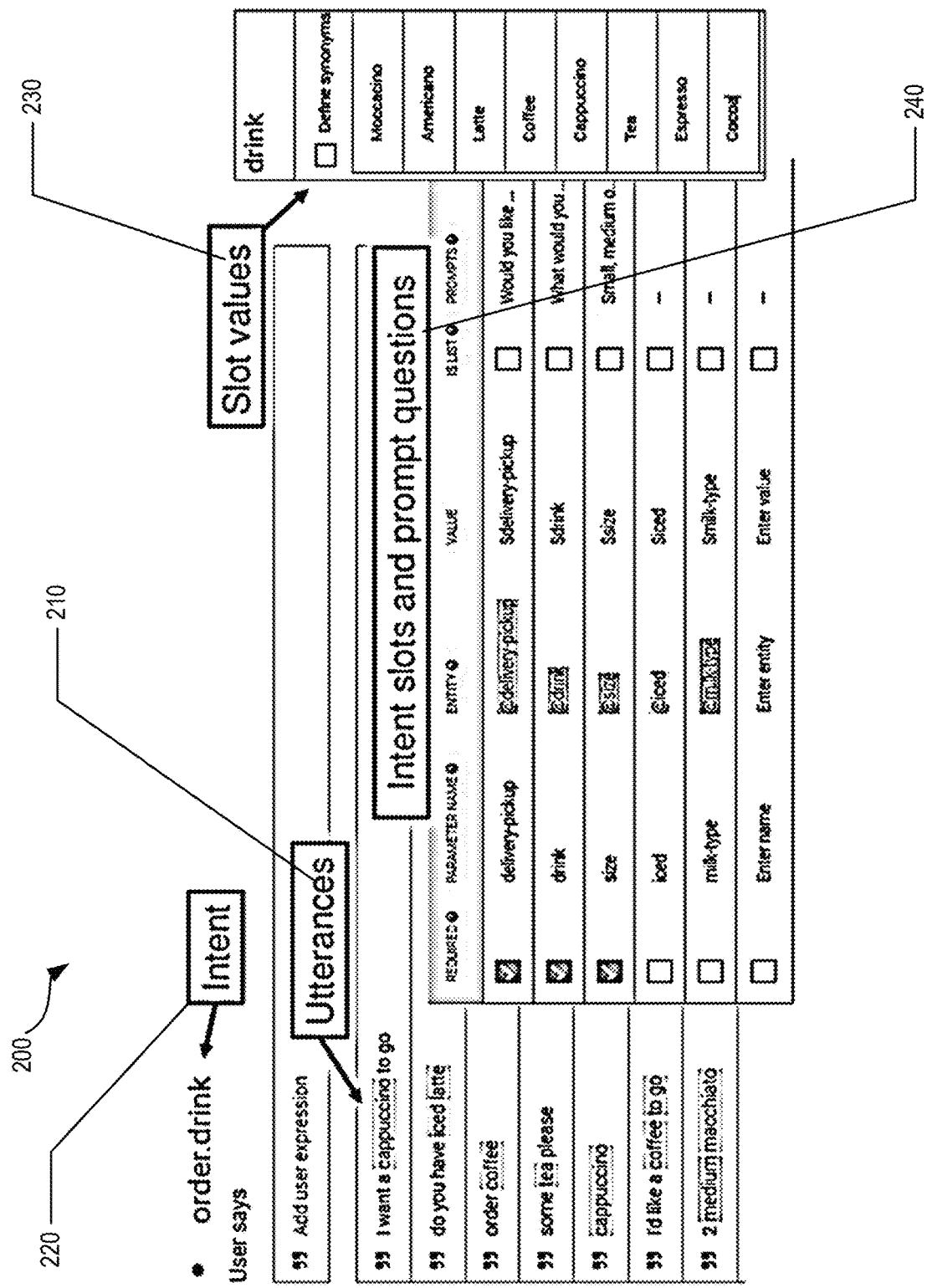
FIG. 2 illustrates an exemplary user interface used in a bot building process in accordance with the herein described systems and methods.

As is shown in FIG. 2, an exemplary bot creation tool 200 is shown having various user interface controls and dialogs. Operatively, in using exemplary bot creation tool 200, a developer can supply one or more examples of user utterances 210 that can operatively map to an intent 220 in the task. In this illustrative operation, a developer can define one or more slots 230 for an intent 220, to tag one or more slot values 230 (the tagging of slot values can illustratively provide required data elements required for the execution of the intent) appearing in the provided utterances 210, as well as provide prompt questions for each slot and specify the order of prompts 240.

Operatively, a developer can repeat these operations to parse user answers, i.e., specifying phrases for possible user answers and tagging slot values in the sample answers. Operatively, to facilitate slot recognition from user phrases, possible values for each slot 240 can be provided. In an illustrative implementation, after specifying dozens of utterance samples for an intent 220 and slot 240, a machine learning model can be trained, which can operatively provide reasonable accuracy on inputs that are similar to the examples.

Figure 3:
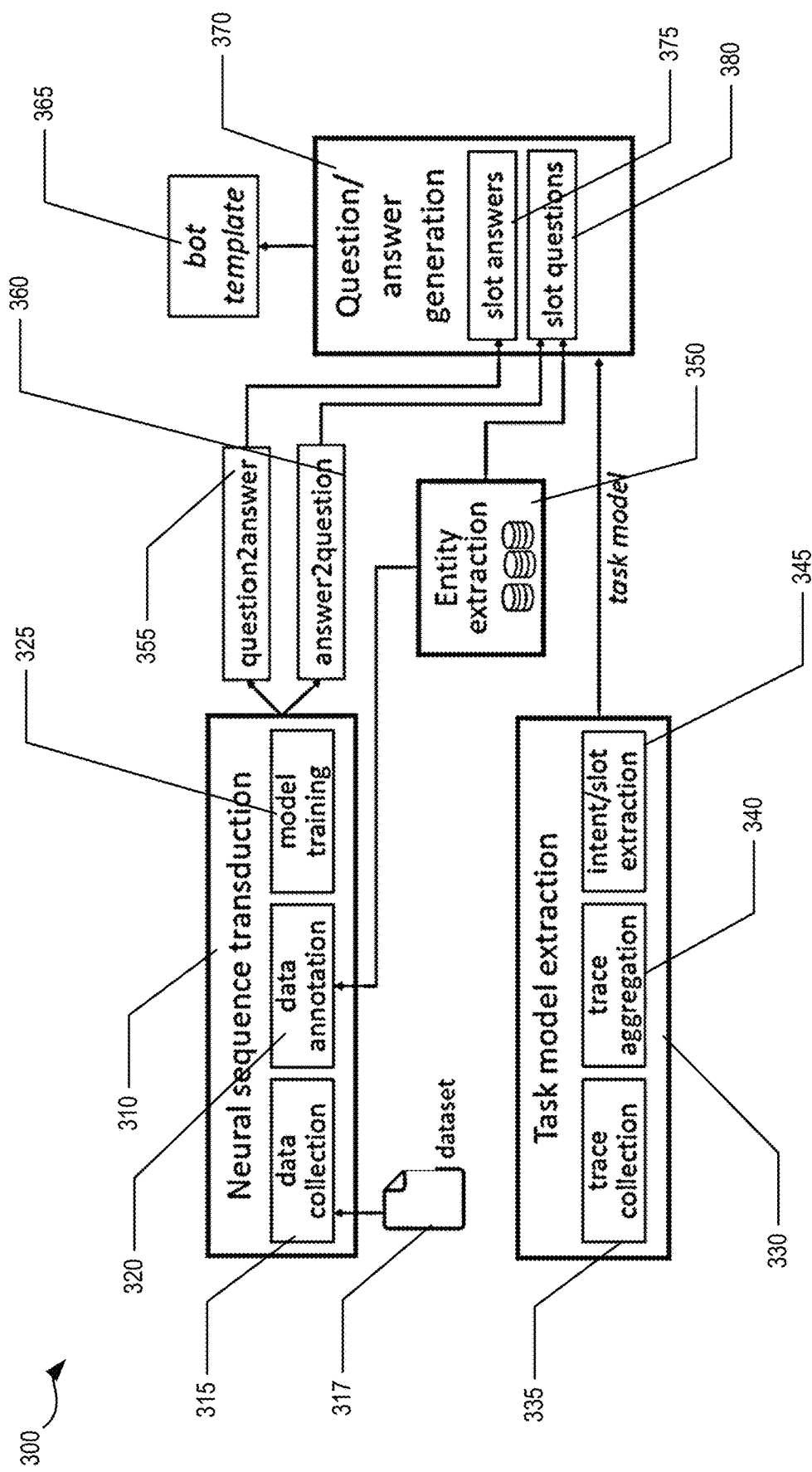
FIG. 3 illustrates a block diagram of an exemplary architecture for use in a bot building process in accordance with the herein described systems and methods.

FIG. 3 illustrates various cooperating components and functions of an exemplary task-oriented conversational bot generation environment 300. As is shown, exemplary task-oriented conversation bot generation environment 300 can include neural sequence transduction module 310, task model extraction module 330, and question/answer generation module 370. Further, as is shown in FIG. 3, neural sequence transduction module 310 can operatively perform various functions including but not limited to data collection 315 (e.g., dataset 317), data annotation 320, and model training 325. Operatively, data collection can be considered the process of collecting data required for the generation of the conversational service, data annotation can be considered a process of associating one or more selected characteristics to the collected data and model training can be considered as one or more instructions that can be inferred from the collected data.

Task model extraction module 330 can operatively perform various functions including but not limited to trace collection 335 (e.g., collection of data representative of the user interaction with an exemplary computing application), trace aggregation 340 (e.g., the consolidation of collected traces according to one or more selected rules), and intent/slot extraction 345 (e.g., the definition of an intent and associated slots to the intent based on the collected trace data).

Question/answer generation module 370 can include but is not limited to generating slot answers 375 that can be operatively generated from question to answer transform 355 (e.g., an operation that correlates answers to questions and questions to answers based on one or more selected rules) operating on data provided by neural sequence transduction module 310 and an exemplary data format from bot template 365. Also, question and answer generation module 370 can include questions 380 that can be operatively generated using data provided by entity extraction module 350 that can operatively receive data from data annotation function 320 of neural sequence transduction module 310. Additionally, slot questions 380 can also be generated by answer to question transform 360 operating on data provided by neural sequence transduction module 310.

Figure 4:
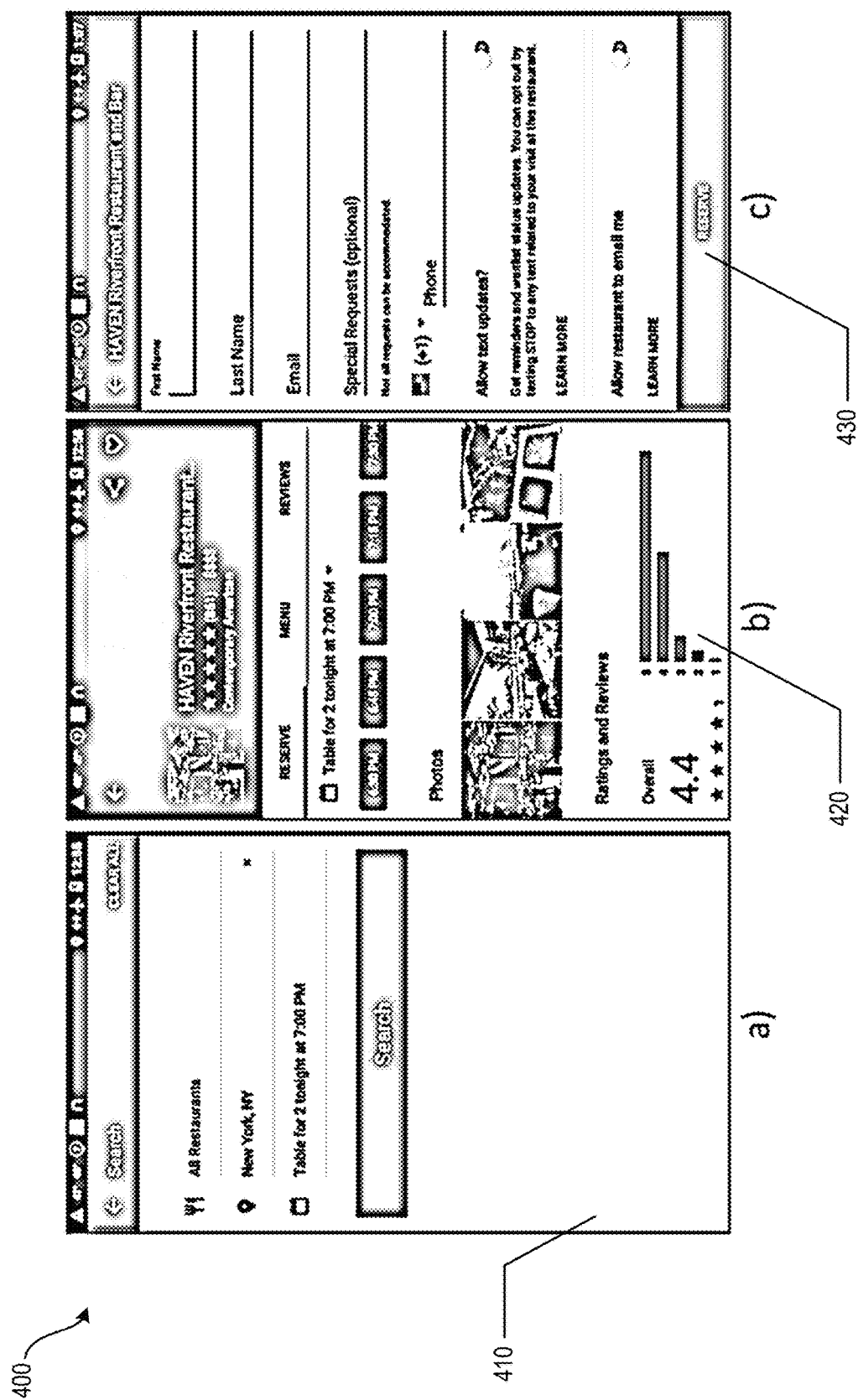
FIG. 4 illustrates an exemplary user interaction trace with an illustrative computing application for use in creating an automated task-oriented conversational bot in accordance with the herein described systems and methods.

FIG. 4 shows three exemplary screens (a, b, and c) from a user interaction with an exemplary mobile computing application 400, (e.g., an application for utilizing the OPENTABLE restaurant reservation service from OPENTABLE) showing a user searching for a restaurant (screen a—410) and selecting a restaurant from a list (not shown), viewing information about the selected restaurant (screen b—420), and making a reservation (screen c —430). Operatively, various intents and slots can be inferred: Start Restaurant Search (screen a—410), View Restaurant Info, View Restaurant Menu and View Restaurant Reviews (screen b—420) which can be defined as a slot—the restaurant name (selected in the restaurant list screen), and Reserve Restaurant (screen c—430) which takes the reservation time as a slot (selected in screen b—420).

In an illustrative operation, to extract intents and slots programmatically, the "app language" can be operatively translated into the "bot language". In the app language, a user can execute a task by interacting with UI elements and transitioning from one page to another. In the bot language, a user can execute a task by filling slots and navigating a graph of intents. Operatively, to extract information from a mobile app, (1) static analysis can be applied that examines the source code of the mobile app without executing it, and/or (2) dynamic analysis, where the app is analyzed by executing it.

In an illustrative implementation, an interaction trace can be represented as a sequence of UI events. Each UI event can be associated with the UI element on which the action was performed (e.g., clicking on a button or entering text in a text field) and the UI tree including the UI elements on the screen at the moment of the interaction with their hierarchical relationships, types and contents. In the illustrative implementation, one or more application traces provided by a developer can be processed to extract a task model. A task model can consist of a collection of intents, the collection can also include a set of slots and dependencies from other intents. A slot can have a name and a set of possible values. In an illustrative implementation, task model extraction can be achieved using trace aggregation, intent extraction, and slot extraction.

Figure 5:
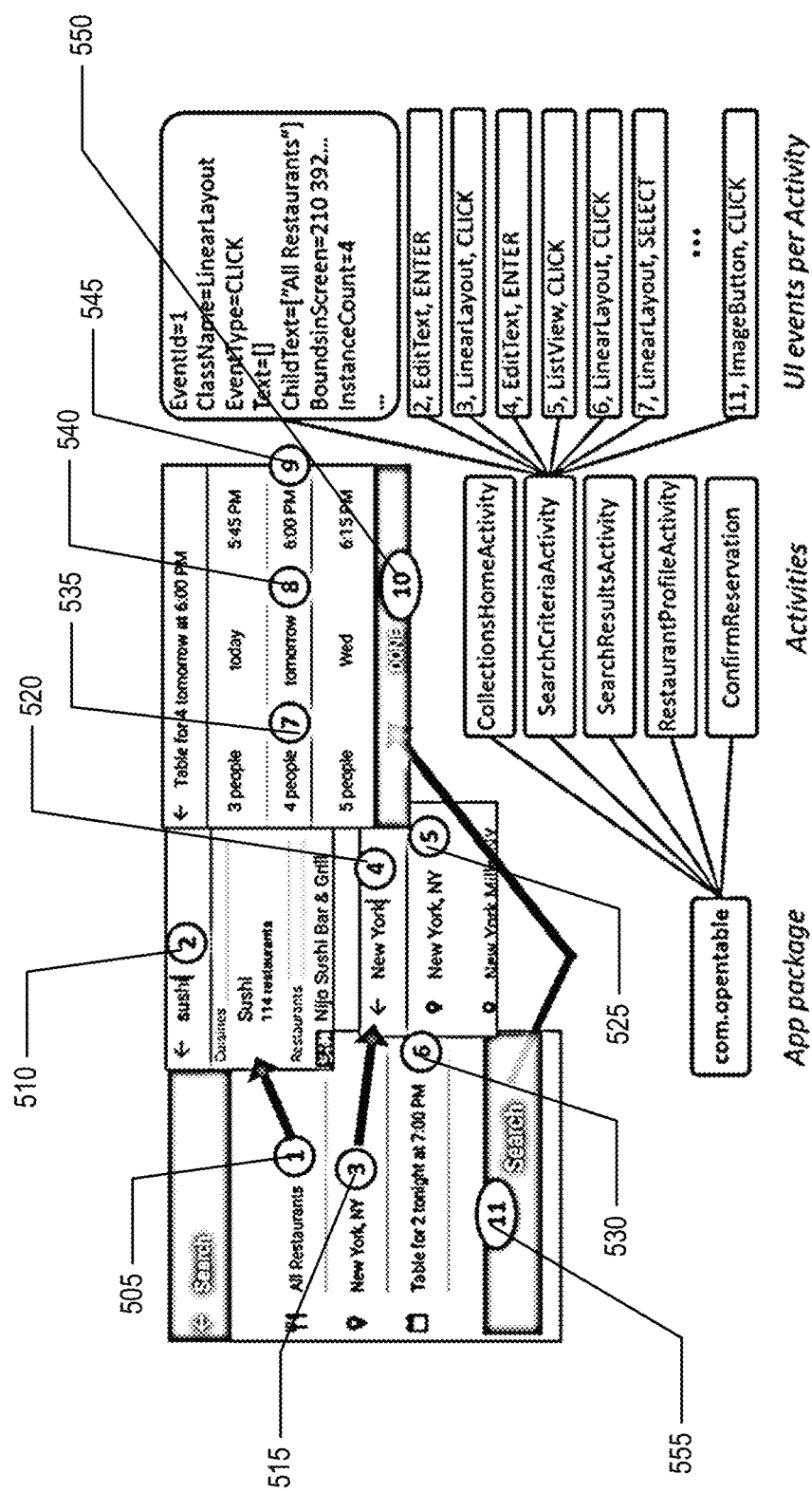
FIG. 5 illustrates an exemplary user interface trace for an illustrative computing application for use in creating an automated task-oriented conversational bot in accordance with the herein described systems and methods.

FIG. 5 shows all of the UI events reported during an illustrative user interaction with the exemplary intent Search Criteria Activity when using the OPENTABLE application described briefly above with regard to FIG. 4. Operatively, interaction 510, 525, and 530 can be used in extraction processing as described in FIG. 3. In an illustrative operation, user interactions 505, 515, 550, and 555 can be eliminated from processing since such interactions are associated with immutable content (e.g., buttons of the exemplary mobile application with static labels that when interacted with cause a transition to a new page or a dialog) that do not provide informative data specific to the generation of the bot. Furthermore, interactions 535, 540, and 545 can be eliminated from extraction processing since such interactions are associated with invisible UI elements which can occur when the application overlays multiple layouts on top of each other. Also, interaction 520 can eliminated from processing since such interaction is associated with empty content. Operatively, slots can be extracted from the remaining UI elements, and an appropriate intent can be assigned to such slots.

Figure 6:
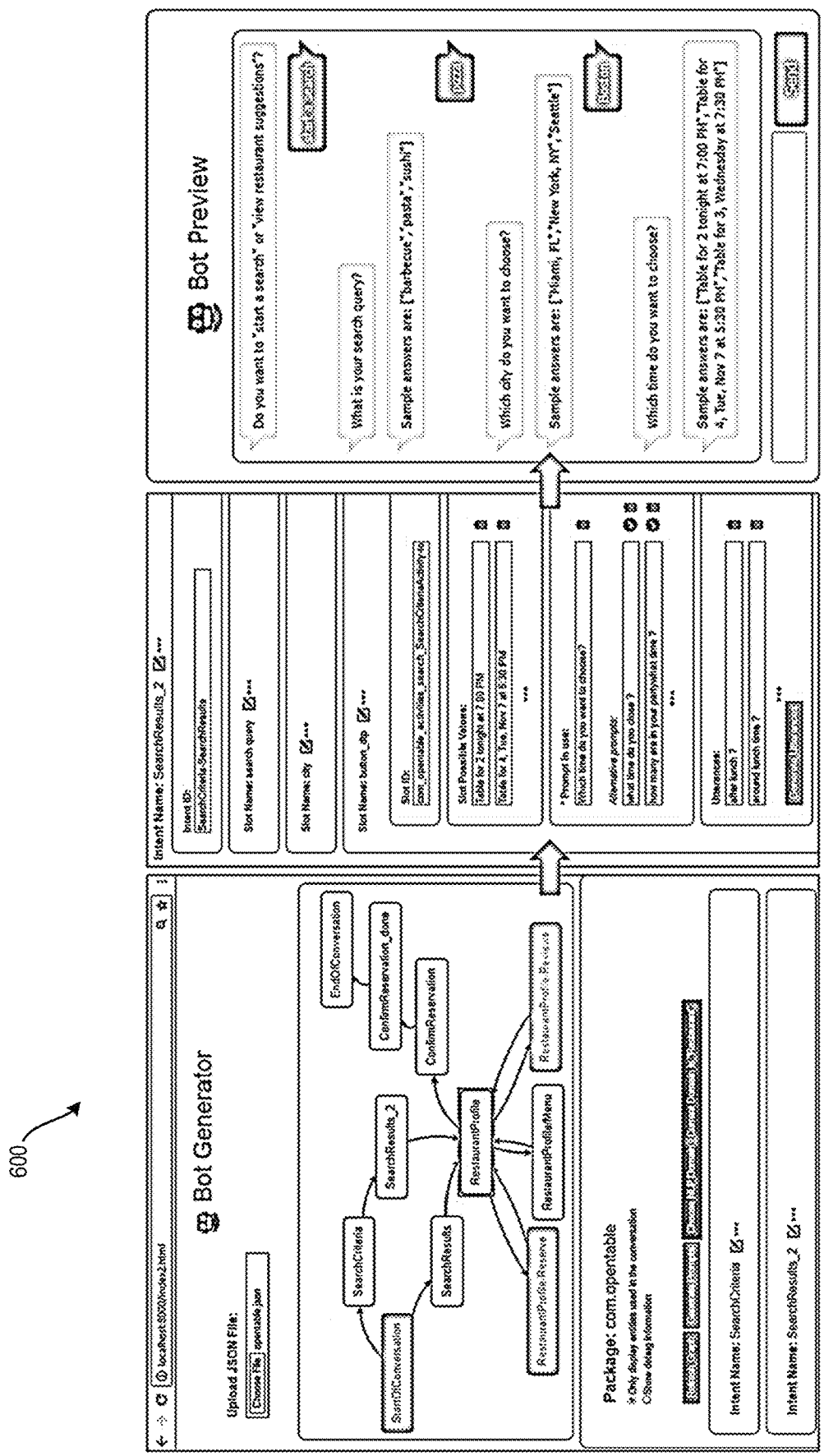
FIG. 6 illustrates an exemplary bot visualization user interface operative to allow a participating user to graphically illustrate the operations used in the creation of a task-oriented conversational bot.

FIG. 6 illustrates exemplary restaurant reservation modeling tool 600 and an exemplary model extracted from the OPENTABLE mobile application described above with regard to FIGS. 4 and 5. As is shown, the node in the graph can represent an intent action the system supports, with additional parameters specific to the intent. Illustratively, the input parameters can be necessary data elements for intent execution. The flow starts with an intent named StartOfConversation and ends with an intent named EndOfConversation.

In an illustrative operation, a restaurant can be searched by viewing restaurant suggestions such as "nearby restaurants" or "outdoor sitting" (through the SearchResults intent) or by doing a custom search (through SearchCriteria and SearchResults_2). For each restaurant identified in the results, one can retrieve profile, reservation options, menu and reviews (using the respective intents), and then proceed to make a reservation (ConfirmReservation) and submit it (ConfirmReservation_done). Slots can be represented as shown at the center of FIG. 6. A custom search (SearchResults_2) can require a number of slots: search query; city; party size; and time. In turn, the slot can maintain a number of fields, name, identifier, values, prompt question, and utterances for possible answers; additional fields can be generated by additional operations.

In the illustrative implementation, the previous operations can produce the logical flow of a bot. Operatively, to navigate the logical flow using natural language, a bot needs to be able to ask questions and understand answers. In the illustrative implementation question generation can be performed—i.e., identifying one appropriate prompt question for every slot, and answer generation can be performed—i.e., generating large sets of possible answers for each prompt so that an answer understanding model can be trained.

Figure 7:
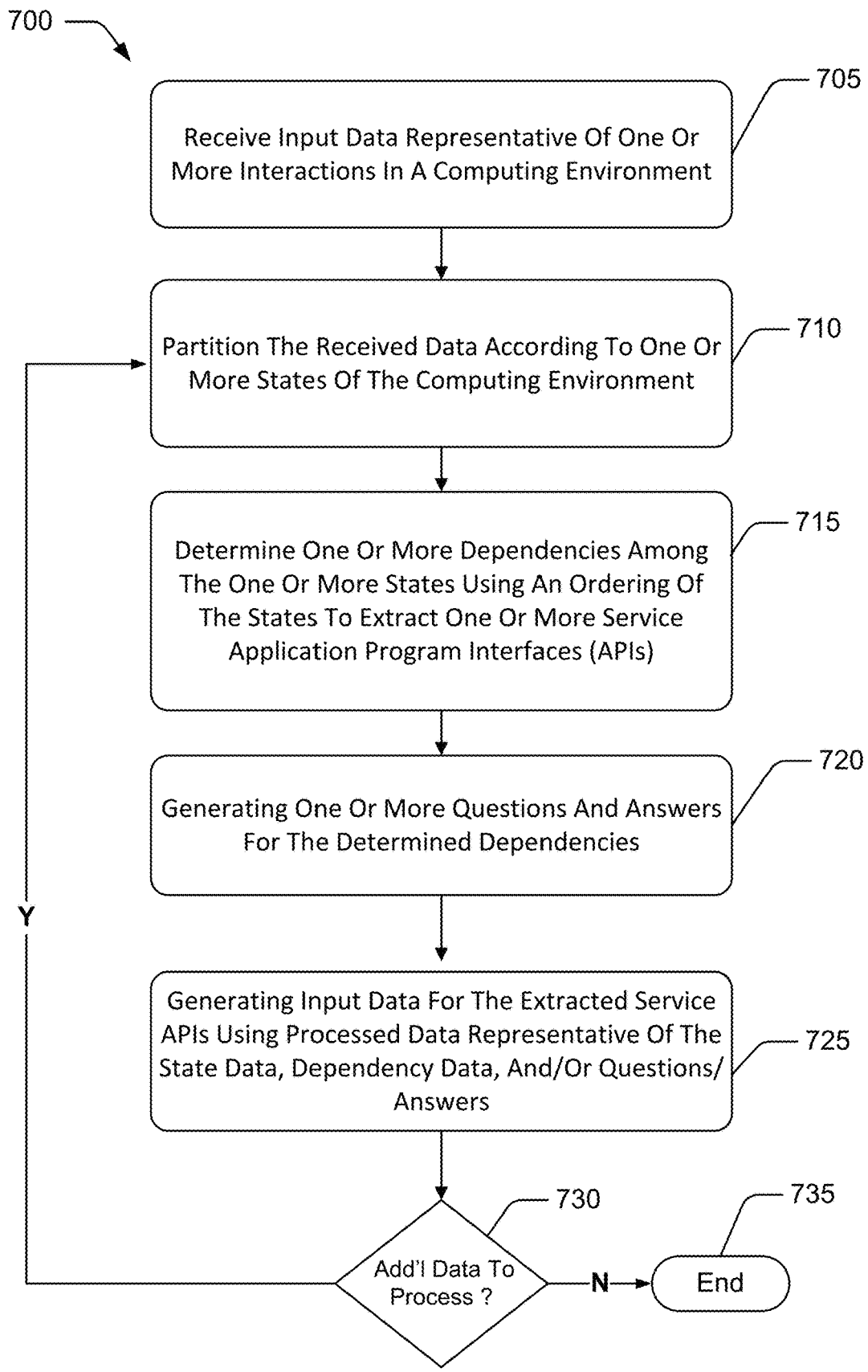
FIG. 7 is a flow diagram of an illustrative process for the automatic creation of task-oriented conversational bots in accordance with the herein described systems and methods.

FIG. 7 is a flow diagram of an illustrative process 700 for the automatic creation of task-oriented conversational bots by an exemplary computing environment resulting in enhanced processing efficiency of the exemplary computing environment. As is shown, processing begins at block 705 where input data representative of one or more interactions with a computing environment can be received. Processing then proceeds to block 710 where the received data can be partitioned according to one or more states of the computing environment.

One or more dependencies between the states can be determined at block 715 and, as described above, such dependencies are used to identify one or more service APIs used by the exemplary computing application. Processing then proceeds to block 720 where one or more questions and one or more answers can be generated from the determined dependencies. The dependency data, along with the generated question/answer data, as well as state data can be used to generate input data for the service APIs.

Processing then proceed to block 730 where a check is performed to determine if there is additional data that requires processing. If there is no additional interaction data, processing terminates at block 735. If additional interaction data requires processing, processing reverts to block 710 and proceeds from there.

Figure 8:
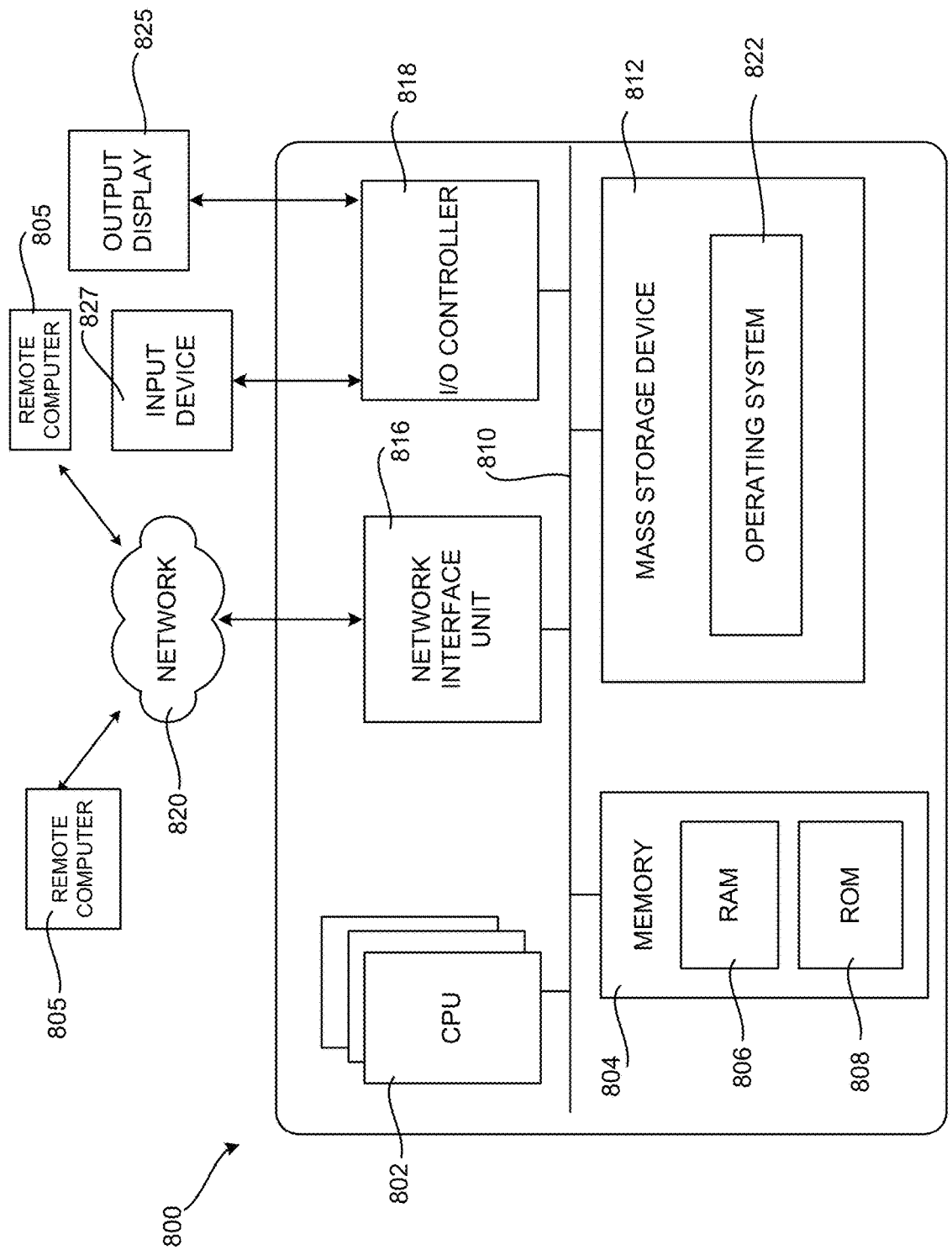
FIG. 8 is a computer architecture diagram showing an illustrative computer hardware and software architecture for a computing device according to one embodiment.

FIG. 8 is a computer architecture diagram showing an illustrative computer hardware and software architecture for a computing device that can operatively execute as described by the herein described systems and methods. In particular, the architecture illustrated in FIG. 9 can be utilized to implement a server computer, mobile phone, an e-reader, a smartphone, a desktop computer, an augmented or virtual reality (AR/VR) device, a tablet computer, a laptop computer, or another type of computing device.

The computer 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the computer 800, such as during startup, can be stored in the ROM 808. The computer 800 further includes a mass storage device 812 for storing an operating system 822, application programs, and other types of programs. The mass storage device 812 can also be configured to store other types of programs and data.

The mass storage device 812 is connected to the CPU 802 through a mass storage controller (not shown) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices 827, including a keyboard, mouse, touch input, an electronic stylus (not shown in FIG. 8), or a physical sensor such as a video camera. Similarly, the input/output controller 818 can provide output to a display screen or other type of output device 825.

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
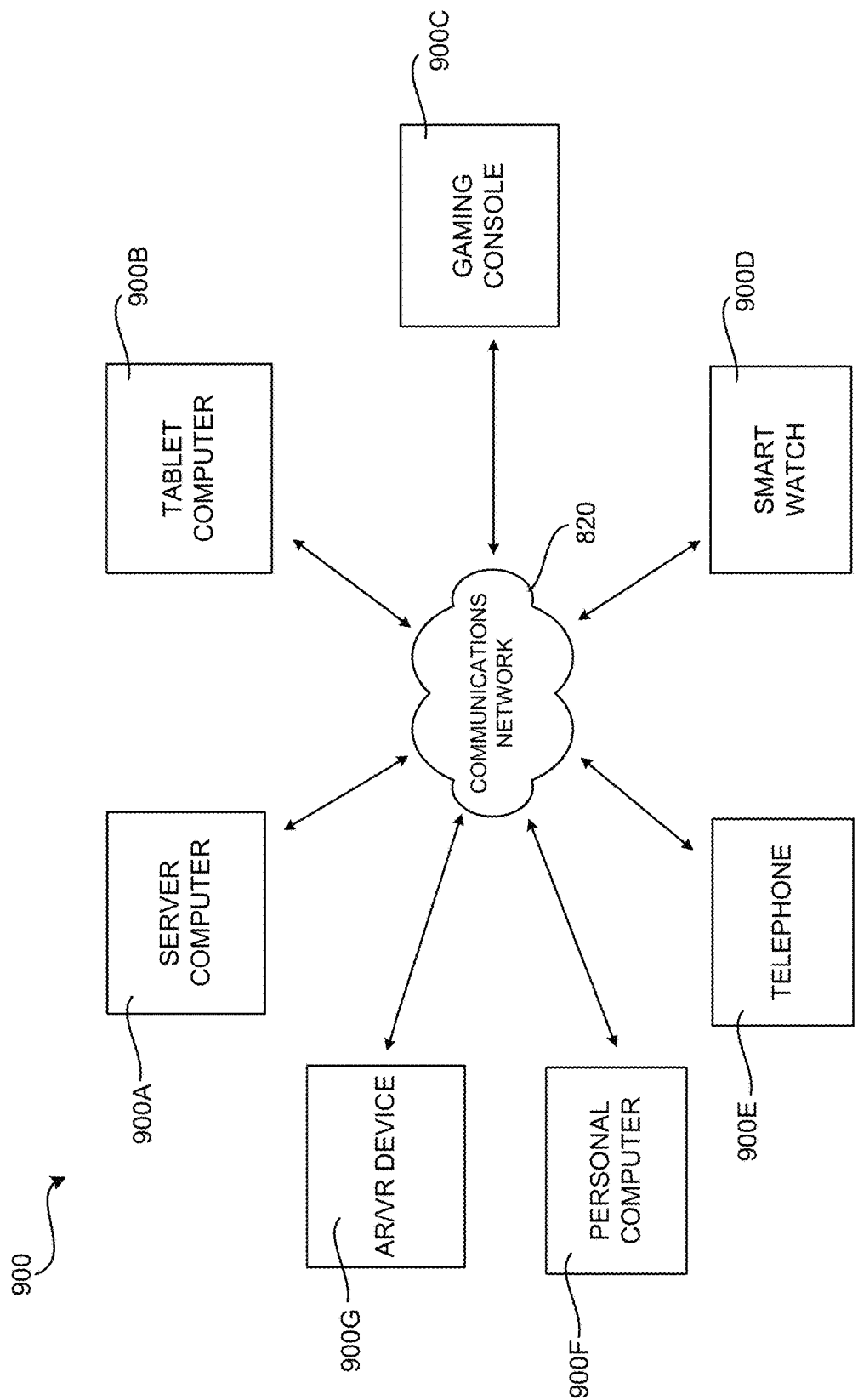
FIG. 9 is a network diagram illustrating a distributed computing environment in which aspects of the disclosed technologies can be implemented, according to various embodiments presented herein.

FIG. 9 is a network diagram illustrating a distributed network computing environment 900 in which aspects of the disclosed technologies can be implemented, according to various embodiments presented herein. As shown in FIG. 9, one or more server computers 900A can be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 900B, a gaming console 900C, a smart watch 900D, a telephone 900E, such as a smartphone, a personal computer 900F, and an AR/VR device 900G.

In a network environment in which the communications network 820 is the Internet, for example, the server computer 900A can be a dedicated server computer operable to process and communicate data to and from the client computing devices 900B-900G via any of a number of known protocols, such as, hypertext transfer protocol ("HTTP"), file transfer protocol ("FTP"), or simple object access protocol ("SOAP"). Additionally, the networked computing environment 900 can utilize various data security protocols such as secured socket layer ("SSL") or pretty good privacy ("PGP"). Each of the client computing devices 900B-900G can be equipped with an operating system operable to support one or more computing applications or terminal sessions such as a web browser (not shown in FIG. 9), or other graphical user interface (not shown in FIG. 9), or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a client computing device 900B-900G to obtain desired data and/or perform other computing applications.

The data and/or computing applications may be stored on the server 900A, or servers 900A, and communicated to cooperating users through the client computing devices 900B-900G over an exemplary communications network 820. A participating user (not shown in FIG. 9) may request access to specific data and applications housed in whole or in part on the server computer 900A. These data may be communicated between the client computing devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage ("NAS") and storage area networks ("SAN") to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

EXAMPLE CLAUSES

The disclosure presented herein encompasses the subject matter set forth the following clauses.

Example Clause A, a system comprising at least one processor and at least one memory having computer-readable instructions stored thereupon that, when executed by the at least one processor, cause the at least one processor to: receive first input data comprising data representative one or more user interactions with one or more programmatic elements, data representative of the one or more programmatic elements, and data representative of the state of an application in which the one or more of the programmatic elements are being executed; process the first input data to generate intermediate processed input data by: partitioning the input data according to one or more selected states of the application; identifying one or more dependencies among the one or more selected application states; and extracting one or more service APIs from the application using the identified one or more dependencies; and generating a natural user interface using the intermediate processing data by generating one or more questions for the identified one or more dependencies; generating samples of user answers for the generated one or more questions; and generating samples of user utterances for triggering the extracted one or more service APIs to be executed by the application.

Example Clause B, the system of claim Example Clause A, wherein the one or more user interactions comprises one or more traces of the behavior of an application.

Example Clause C, the system of Example Clauses A or B, wherein the data representative of the one or more programmatic elements comprises data representative of a user interface of an application executable on the computing environment.

Example Clause D, the system of Example Clauses A through C, wherein the computer-readable instructions further cause the at least one processor to partition the first input data according to one or more selected application states comprising one or more states of a user interface of an application executable on the computing environment and one or more states representative of one or more internal processing states of the application executable on the computing environment.

Example Clause E, the system of Example Clauses A through D, wherein data representative of the state of the application in which the programmatic element is being executed comprises dynamic application state, static application state, and the state of an underlying operating system for a computer environment on which the application is executed.

Example Clause F, the system of Example Clauses A through E, wherein the computer-readable instructions further cause the at least one processor to order the one or more selected application states as one or more elements of a state graph, the state graph comprising data representative of the one or more dependencies among the one or more selected application states.

Example Clause G, the system of Example Clauses A through F, wherein the computer-readable instructions further cause the at least one processor to extract the one or more service APIs as one or more paths on the state graph, the one or more paths comprising data representative of the one or more selected states of the application.

Example Clause H, a computer-implemented method, comprising: receiving first input data by a computing environment comprising data representative of one or more user interactions with one or more programmatic elements, data representative of the one or more programmatic elements, and data representative of the state of an application in which the one or more programmatic elements are being executed; processing the first input data to generate intermediate processed input data by: partitioning the first input data according to one or more selected application states; ordering the one or more selected application states as one or more elements of a state graph; and extracting one or more service application program interfaces (APIs) as one or more paths of the state graph, the one or more paths comprising data representative of one or more parameters for the extracted one or more service APIs; and generating a natural user interface using the intermediate processed input data by: generating one or more questions for the identified parameters; generating samples of one or more user answer to the generated one or more questions; and generating one or more user utterances for triggering the extracted one or more service APIs to be executed by the application.

Example Clause I, the computer-implemented method of Example Clause H further comprising performing a trace of the application operative on the computing environment, the trace generating data representative of processed data by one or more functions of the application.

Example Clause J, the computer-implemented method of Example Clauses H and I, wherein partitioning the first input data according to one or more selected application states comprises partitioning the first input data according to one or more states of a user interface of the application and one or more internal processing states of the application.

Example Clause K, the computer-implemented method of Example Clauses H through J, wherein the state graph further comprises data representative of the one or more dependencies among the one or more selected application states.

Example Clause L, the computer-implemented method of Example Clauses H through K, further comprising generating a skill from the generated input data provided to the one or more service APIs to execute.

Example Clause M, the computer-implemented method of Example Clauses H through L, further comprising generating a skill and providing the skill to the one or more user channels to execute, the one or more user channels comprising a cooperating computing application.

Example Clauses N, the computer-implemented method of Example Clauses H through M, further comprising identifying one or more service APIs from the received input data.

Example Clauses O, the computer-implemented method of Example Clauses H through N, further comprising training the computing environment to generate the one or more questions for the identified parameters and to generate the samples of one or more user answers to the generated one or more questions.

Example Clause P, a computer-readable storage medium having computer-executable instructions stored thereupon which, when executed by one or more processors of a computing device, cause the one or more processors of the computing device to: receive first input data comprising data representative of one or more user interactions with a programmatic element, data representative of the programmatic elements, and data representative of the state of an application in which the programmatic element is being executed; process the first input data to generate intermediate processed input data by: partitioning the first input data according to one or more selected application states; identifying one or more dependencies among the one or more selected application states; and extracting one or more service application program interfaces (APIs) from the application using the identified one or more dependencies; and generating a natural user interface using the intermediate processed input data by: generating one or more questions for the identified one or more dependencies; generating samples of user answers for the generated one or more questions; and generating samples of one or more user utterances for the extracted one or more service APIs to be executed by the application.

Example Clause Q, the computer-readable storage medium of Example Clause P, wherein the instructions further cause the one or more processors of the computing device to: trace generating data representative of processed data by one or more functions of the application.

Example Clause R, the computer-readable storage medium of Example Clauses P and Q, wherein the instructions further cause the one or more processors of the computing device to: order the one or more selected application states as one or more elements of a state graph, the state graph comprising data representative of the one or more dependencies among the one or more selected application states.

Example Clause S, the computer-readable storage medium of Example Clauses P through R, wherein the instructions further cause the one or more processors of the computing device to: extract the one or more service APIs as one or more paths on the state graph, the one or more paths comprising data representative of one or more states of the application.

Example Clause T, the computer-readable storage medium of Example Clauses P through S, wherein the instructions further cause the one or more processors of the computing device to: define one or more service APIs from the received input data.

CONCLUSION

In closing, although the various techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A system comprising:
   at least one processor; and
   at least one memory having computer-readable instructions stored thereupon that, when executed by the at least one processor, cause the at least one processor to:
   receive first input data comprising data representative of one or more user interactions with one or more programmatic elements, data representative of the one or more programmatic elements, and data representative of a state of an application in which the one or more of the programmatic elements are being executed;
   process the first input data to generate intermediate processed input data by:
      partitioning the first input data according to one or more selected application states application;
      identifying one or more dependencies among the one or more selected application states; and
      extracting one or more service application program interfaces (APIs) from the application using an identified one or more states and one or more dependencies; and
   generating a user interface using the intermediate processed input data by:
      generating one or more questions for the identified one or more dependencies;
      generating samples of user answers for the generated one or more questions; and
      generating sample of user utterances for triggering the extracted one or more service APIs to be executed by the application.

2. The system of claim 1, wherein the one or more user interactions comprise one or more traces of a behavior of the application.

3. The system of claim 1, wherein the data representative of the one or more programmatic elements comprises data representative of a user interface of the application.

4. The system of claim 1, wherein the computer-readable instructions further cause the at least one processor to partition the first input data according to one or more selected application states comprising one or more states of a user interface of an application executable on a computing environment and one or more states representative of one or more internal processing states of the application executable on the computing environment.

5. The system of claim 1, wherein data representative of the state of the application in which the programmatic element is being executed comprises dynamic application state, static application state, and the state of an underlying operating system for a computer environment on which the application is executed.

6. The system of claim 1, wherein the computer-readable instructions further cause the at least one processor to order the one or more selected application states as one or more elements of a state graph, the state graph comprising data representative of the one or more dependencies among the one or more selected application states.

7. The system of claim 6, wherein the computer-readable instructions further cause the at least one processor to extract the one or more service APIs as one or more paths on the state graph, the one or more paths comprising data representative of the one or more selected states of the application.

8. A computer-implemented method, comprising:
   receiving first input data by a computing environment comprising data representative of one or more user interactions with one or more programmatic elements, data representative of the one or more programmatic elements, and data representative of a state of an application in which the one or more programmatic elements are being executed;
   processing the first input data to generate intermediate processed input data by:
      partitioning the first input data according to one or more selected application states;
      ordering the one or more selected application states as one or more elements of a state graph, wherein the state graph comprises data representative of one or more dependencies among the one or more selected application states; and
      extracting one or more service application program interfaces (APIs) as one or more paths of the state graph, the one or more paths comprising data representative of one or more parameters for the extracted one or more service APIs; and
   generating a natural user interface using the intermediate processed input data by:
      generating one or more questions for an identified parameter;
      generating samples of one or more user answer to the generated one or more questions; and
      generating samples of one or more user utterances for the extracted one or more service APIs to be executed by the application.

9. The computer-implemented method of claim 8, further comprising performing a trace of the application operative on the computing environment, the trace generating data representative of processed data by one or more functions of the application.

10. The computer-implemented method of claim 8, wherein partitioning the first input data according to one or more selected application states comprises partitioning the first input data according to one or more states of a user interface of the application and one or more internal processing states of the application.

11. The computer-implemented method of claim 8, wherein one or more paths comprise data representative of one or more states of the application.

12. The computer-implemented method of claim 11, further comprising generating a skill and providing the skill to one or more user channels to execute, the one or more user channels comprising a cooperating computing application.

13. The computer-implemented method of claim 8, further comprising identifying one or more service APIs from the received input data or user request.

14. The computer-implemented method of claim 8, further comprising training the computing environment to generate the one or more questions for the identified parameter, to generate the samples of one or more user answers to the generated one or more questions, and to generate the samples of one or more user utterances for the identified action or service API.

15. A non-transitory computer-readable storage medium having computer-executable instructions stored thereupon which, when executed by one or more processors of a computing device, cause the one or more processors of the computing device to:
   receive first input data comprising data representative of one or more user interactions with a programmatic element, data representative of the programmatic elements, and data representative of a state of an application in which the programmatic element is being executed;

process the first input data to generate intermediate processed input data by:
  partitioning the first input data according to one or more selected application states;
  identifying one or more dependencies among the one or more selected application states; and
  extracting one or more service application program interfaces (APIs) from the application using the identified one or more dependencies; and generating a natural user interface using the intermediate processed input data by:
  generating one or more questions for the identified one or more dependencies;
  generating samples of user answers for the generated one or more questions; and
  generating samples of one or more utterances for the extracted one or more service APIs to be executed by the application.

16. The non-transitory computer-readable storage medium of claim 15, wherein the instructions further cause the one or more processors of the computing device to:
trace generating data representative of processed data by one or more functions of the application.

17. The non-transitory computer-readable storage medium of claim 16, wherein the instructions further cause the one or more processors of the computing device to:
order the one or more selected application states as one or more elements of a state graph, the state graph comprising data representative of the one or more dependencies among the one or more selected application states.

18. The non-transitory computer-readable storage medium of claim 15, wherein the instructions further cause the one or more processors of the computing device to:
extract the one or more service APIs as one or more paths on the state graph, the one or more paths comprising data representative of one or more states of the application.

19. The non-transitory computer-readable storage medium of claim 15, wherein the instructions further cause the one or more processors of the computing device to:
define one or more service APIs from the received input data.

* * * * *